(12) United States Patent
Blumberg (10) Patent No.: US 7,301,137 B2
(45) Date of Patent: Nov. 27, 2007

(54) CANTILEVER LIGHT DETECTORS HAVING A MECHANICAL CANTILEVER TO MECHANICALLY RESPOND TO ILLUMINATED LIGHT

(75) Inventor: Girsh Blumberg, New Providence, NJ (US)

(73) Assignee: Lucent Technologies Inc., Murray Hill, NJ (US)

(*) Notice: Subject to any disclaimer, the term of this patent is extended or adjusted under 35 U.S.C. 154(b) by 27 days.

(21) Appl. No.: 11/400,909

(22) Filed: Apr. 10, 2006

(65) Prior Publication Data
US 2007/0235636 A1    Oct. 11, 2007

(51) Int. Cl.
    *H01J 40/14*    (2006.01)
(52) U.S. Cl. .................. 250/221; 250/548
(58) Field of Classification Search .......... 250/221, 250/548, 214 R, 214.1, 201.1, 201.3, 559.29, 250/306, 307, 239; 73/24.02
See application file for complete search history.

(56) References Cited

U.S. PATENT DOCUMENTS 5,329,103 A * 7/1994 Rando .............. 235/462.36
6,489,776 B1  12/2002 Stowe et al. ............ 324/458

OTHER PUBLICATIONS

U.S. Appl. No. 11/036,438, filed Jan. 13, 2005, Aksyuk et al.
U.S. Appl. No. 10/954,739, filed Sep. 30, 2004, Blumberg et al.
Stowe, T.D. et al., "Attonewton.force detection using ultrathin silicon cantilevers," Applied Physics Letters, vol. 71, pp. 288-290, 1997.
Mamin, H.J. et al., "Sub-attonewton force detection at millikelvin temperatures," Applied Physics Letters, vol. 79, No. 20, pp. 3358-3360, Nov. 12, 2001.
Grober, R.D. et al., "Fundamental limits to force detection using quartz tuning forks," Review of Scientific Instruments, vol. 71, No. 7, pp. 2776-2780, Jul. 2000.

* cited by examiner

*Primary Examiner*—Que T Le
(74) *Attorney, Agent, or Firm*—John F. McCabe (57) ABSTRACT

An apparatus includes a chamber, an electro-mechanical driver, a window, and a mechanical cantilever. The chamber has an interior in which the mechanical cantilever is located. The mechanical cantilever has a first end that is attached to the electro-mechanical driver and has second end that is free. The driver is configured to drive the mechanical cantilever to perform an oscillatory motion. The window is located along a wall of the chamber to enable external light to enter the chamber and illuminate a portion of the mechanical cantilever. The mechanical cantilever is configured to mechanically respond to being illuminated by the external light entering the chamber via the window.

20 Claims, 8 Drawing Sheets

CANTILEVER LIGHT DETECTORS HAVING A MECHANICAL CANTILEVER TO MECHANICALLY RESPOND TO ILLUMINATED LIGHT

BACKGROUND

1. Technical Field

The inventions relate to light detectors and methods of detecting light.

2. Discussion of the Related Art

This section introduces aspects that may be helpful to facilitating a better understanding of the inventions. Accordingly, the statements of this section are to be read in this light. The statements of this section are not to be understood as admissions about what is in the prior art or what is not in the prior art.

Light detectors have used a variety of physical processes to measure light intensities. Examples of the physical processes include light-induced chemical reactions, light-induced heating, and light-induced charge carrier transfers. Each such physical process has limitations on its ability to measure incident light intensities. Some limitations on the measurement abilities result from the speed of the physical process and/or the wavelength-selectivity of the physical process.

BRIEF SUMMARY

In a first aspect, an apparatus includes a chamber, an electro-mechanical driver, a window, and a mechanical cantilever. The chamber has an interior in which the mechanical cantilever is located. The mechanical cantilever has a first end that is attached to the electro-mechanical driver and has second end that is free. The driver is configured to drive the mechanical cantilever to perform an oscillatory motion. The window is located along a wall of the chamber to enable external light to enter the chamber and illuminate a portion of the mechanical cantilever. The mechanical cantilever is configured to mechanically respond to being illuminated by the external light entering the chamber via the window.

In some embodiments, the apparatus includes a motion detector configured to track the position of the mechanical cantilever. The motion detector may include a light source configured to direct a light beam toward a surface of the cantilever and a light detector configured to output a data signal indicative of the position of the mechanical cantilever in response to measuring a part of the light beam reflected by the mechanical cantilever. The apparatus may also include a processor configured to determine an intensity of the external light from a data signal output by the light detector.

In some embodiments, the chamber may be substantially evacuated of gas.

In a second aspect, a method includes exposing one surface of a mechanical cantilever to incident light while driving the mechanical cantilever over a range of frequencies. The method includes determining one or more dynamical mechanical characteristics of the mechanical cantilever from measurements on a motion of the cantilever while performing the driving. The method also includes determining the intensity of the incident light from the determined one or more dynamical characteristics.

In some embodiments of the method, the step of exposing may include maintaining a substantial vacuum around the mechanical cantilever.

In some embodiments of the method, one of the one or more determined dynamical mechanical characteristics is a mechanical resonance characteristic of the mechanical cantilever. The one of the one or more determined dynamical mechanical characteristics may be indicative of a mechanical resonance frequency, a mechanical resonance amplitude, or a phase lag of the driven mechanical cantilever.

In some embodiments of the method, the step of determining the intensity may further include comparing the determined one or more dynamical mechanical characteristics to reference values of the same one or more dynamical mechanical characteristics.

In a third aspect, an apparatus includes an electro-mechanical driver, an array of mechanical cantilevers, and an array of motion detectors. Each cantilever has a first end physically attached to the electro-mechanical driver and has a second end free to perform an oscillatory motion in response to the first end being driven by the electro-mechanical driver. Each motion detector is configured to track a position of a corresponding one of the mechanical cantilevers. Each mechanical cantilever is mechanically responsive to an intensity of light incident thereon.

In some embodiments, the apparatus may further include a substantially evacuated chamber and a window that enables light to enter the chamber. The array of mechanical cantilevers may be located in the chamber. The window is located to enable the light to illuminate the mechanical cantilevers. In some embodiments, the window may be configured to block visible light.

In some embodiments, the apparatus may also include a processor that is connected to receive data signals from the motion detectors. The processor is configured to produce image data indicative of an intensity pattern formed by the light incident on the mechanical cantilevers based on the received data signals. The processor may be configured to determine an intensity of light that is incident on one of the mechanical cantilevers based on a value of a mechanical resonance characteristic of the one of the mechanical cantilevers. The value is determined from the received data signals.

BRIEF DESCRIPTION OF THE DRAWINGS

In the Figures and text, like reference numerals indicate elements with similar functions.

In some Figures, relative dimensions of some features may be exaggerated to more clearly show one or more of the structures being illustrated.

Herein, various embodiments are described more fully by the Figures and the Detailed Description of Illustrative Embodiments. Nevertheless, the inventions may be embodied in various forms and are not limited to the embodiments described in the Figures and Detailed Description of Illustrative Embodiments.

DETAILED DESCRIPTION OF ILLUSTRATIVE EMBODIMENTS

Various embodiments of light detectors use a mechanical reaction to detect and/or measure intensities of incident light. In particular, the mechanical reaction is a dynamical mechanical response of a mechanical cantilever to incident light. Some of the mechanical cantilevers have a rapid dynamical mechanical response to incident light. For that reason, light detectors incorporating such mechanical cantilevers may have rapid response times. Some mechanical cantilevers may have a substantial dynamical mechanical response to light in wavelength ranges where other physical processes for sensitive and high-speed detection of light are less available. For that reason, light detectors incorporating such mechanical cantilevers may be advantageous for detecting light and/or measuring light intensities in those wavelength ranges.

Figure 1:
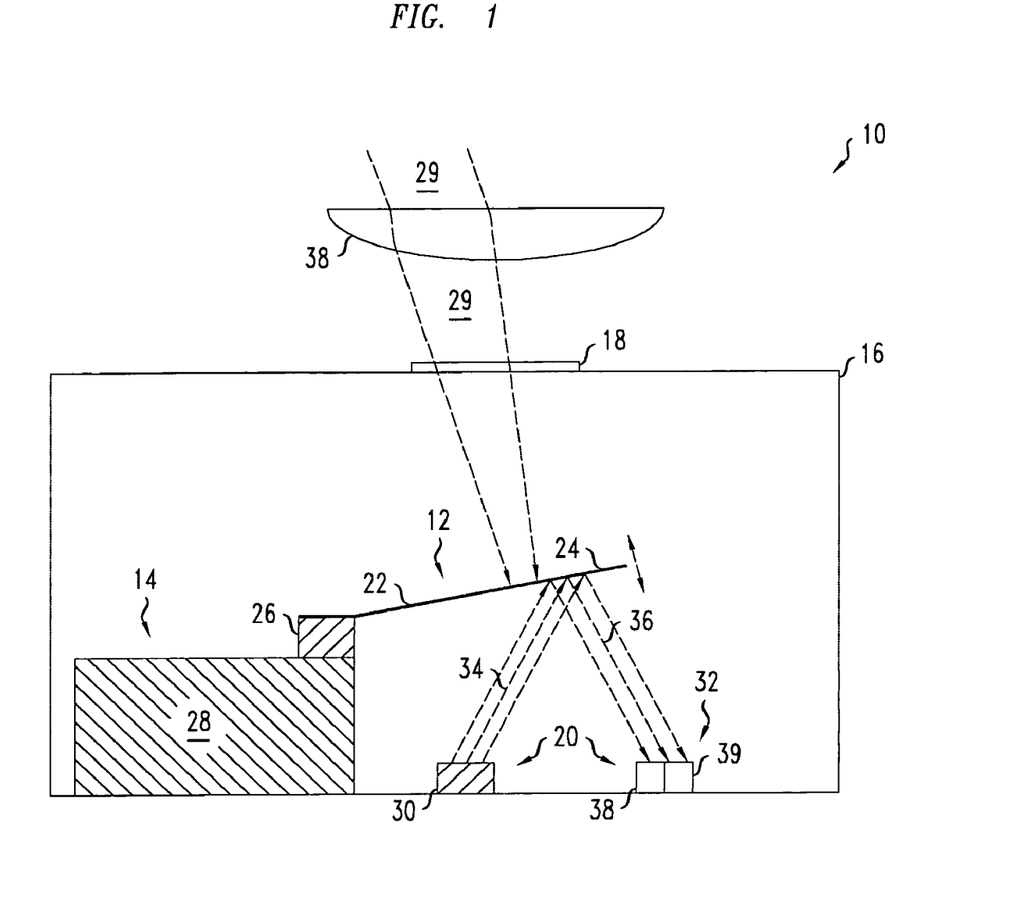
FIG. 1 is a side-view illustrating one embodiment of a light detector.

FIG. 1 shows a light detector 10 that includes a mechanical cantilever 12, an electro-mechanical driver 14, a sealed chamber 16, a window 18, and a motion detector 20.

In the light detector 10, the mechanical cantilever 12 has an arm 22 with a first free end 24 and a second end physically attached to the electro-mechanical driver 14. A rigid support 26 may optionally provide the physical attachment between the second end of the mechanical cantilever 12 and the electro-mechanical driver 14. Due to its form and/or physical attachment, the free end 24 of the mechanical cantilever 12 is capable of performing oscillatory movements. In particular, the physical attachment of the arm 22 to the electro-mechanical driver 14 may be flexible, and/or the arm 22 of the mechanical cantilever may be flexible itself. The flexibility associated with the attachment of the second end and/or the arm 22 itself enables the free end 24 of the mechanical cantilever 12 to perform oscillatory motions at relatively high frequencies.

Figure 2:
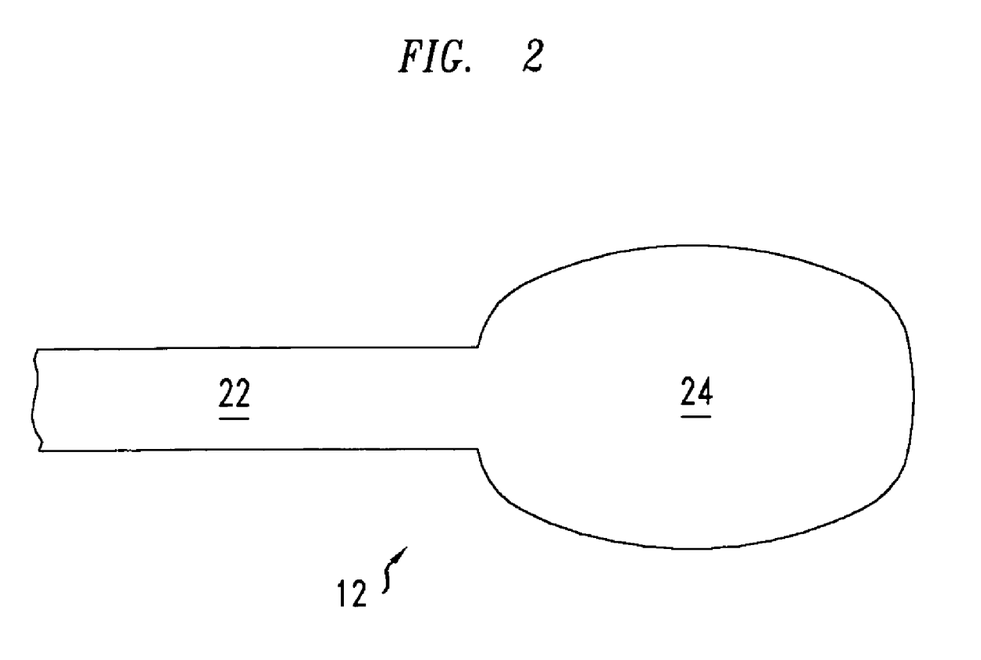
FIG. 2 is a top view of a distal portion of an exemplary mechanical cantilever for the light detector of FIG. 1.

The mechanical cantilever 12 may be, e.g., a micromechanical device that is fabricated from layered semiconductor and/or dielectric structures by standard microelectronics fabrication processes. An exemplary shape for a distal portion of such a mechanical cantilever 12 is shown in FIG. 2. The exemplary cantilever 12 may have a silicon arm 22, which may have, e.g., a thickness of one µm or less, a width of 10 to 100 µm, and a length of 100 to 1,000 µm. As illustrated, the free end 24 of the mechanical cantilever 12 may be wider than the remainder of the arm 24 so that the mechanical cantilever 12 has large area for interacting with incident light while having sufficient flexibility.

In the light detector 10, the electro-mechanical driver 14 applies a mechanical driving signal to the attached end of the mechanical cantilever 12, e.g., through the rigid support 26. The electro-mechanical driver 14 may include a planar piezoelectric structure 28 and an alternating current (AC) source (not shown) that is connected across the piezoelectric structure 28. The fabrication of electro-mechanical drivers from planar piezoelectric structures is well known to those of skill in the art. The AC source is connected to produce an alternating voltage across the piezoelectric structure 28. The alternating voltage causes the piezoelectric structure 28 and the physically attached end of the mechanical cantilever 12 to oscillate at the AC driving frequency. The AC source may be configured to produce voltages with a range of driving frequencies that surround the mechanical resonance frequency of the mechanical cantilever 12.

In the light detector 10, the chamber 16 is hermetically sealed and has a substantially evacuated interior. The substantially evacuated interior may have a gas pressure that is less than about 0.01 atmospheres and may have a gas pressure that is, e.g., less than about 0.001 atmospheres, or even less than about 0.0001 atmospheres. The interior of the chamber 16 houses the entire mechanical cantilever 12. The substantial evacuation of the interior of the chamber 16 reduces the interference that ambient gas causes to the dynamic mechanical response of the mechanical cantilever 12 to incident light.

In the light detector 10, the window 18 allows external light 29 to enter into the chamber 16 without destroying the substantial vacuum in the chamber 16. The window 18 is configured and/or located so that such external light 29 can be focused on a portion of the mechanical cantilever 12, e.g., onto the free end 24.

The window 18 is substantially transparent to external light 29 in a selected wavelength range. In some embodiments, the window 18 may also substantially block light with wavelengths outside of the selected wavelength range. In such embodiments, the window 18 functions as a band pass filter that causes the light detector 10 to be only sensitive to external light 29 in the selected wavelength range. For example, in some embodiments, the window may allow light of a selected infrared wavelength range to enter the chamber 16 while blocking visible light. Then, the light detector 10 can function as a detector that selectively detects infrared light.

In the light detector 10, the motion detector 20 is configured to monitor the oscillatory movement of the distal portion of the mechanical cantilever 12. Based on the monitoring, the motion detector 20 outputs one or more data signals that enable determining the amplitude, frequency, and/or phase lag of the motion of the distal portion of the mechanical cantilever 12.

The motion detector 20 includes a light source 30, e.g., a weak light source, and a light detector 32. The light source 30 is configured to transmit a collimated light beam 34 toward a portion of the reflective back surface of the mechanical cantilever 12 near the free end 24. In particular, the light source is configured so that the mechanical cantilever 12 reflects a portion 36 of the collimated light beam 34 towards the light detector 32. The light detector 32 is a spatially segmented, position-sensitive light detector. Examples of such light detectors 32 include four-quarter type photodetectors, charge coupled detectors (CCDs), and adjacent photodiodes connected to provide differential detection. The individual light-detecting segments 38, 39 of the light detector 32 are oriented so that relative light intensities thereon are indicative of the position of the free end 24 of the mechanical cantilever 12 during its motion. In particular, the evolution of the relative light intensities as detected by the segments 38, 39 may be used to identify maximum displacements of the mechanical cantilever 12 during its oscillatory motion, e.g., via a differential detection scheme. For that reason, the motion detector 20 provides data signals sufficient to determine the mechanical resonance amplitude, mechanical resonance frequency and/or the phase during the oscillatory motion of the mechanical cantilever 12.

In various embodiments, the light source and detector 30, 32 of the motion detector 20 may use measurement light in a different wavelength range than the wavelength range being detected by the light detector 10. For example, in the light detector 10, the window 18 may be transparent to only infrared light whereas the light detector 32 is responsive to visible light. For example, the light detector 32 may be a CCD that is sensitive to visible light and insensitive to infrared light. Thus, the light detector 10 enables detecting light outside of the wavelength range of the light detector 32 used to monitor the motion of the mechanical cantilever 12. In such embodiments, the light-detector 10, which relies on the light-sensitivity of the mechanical cantilever 12, could extend the detection sensitivity to wavelengths where such CCDs are not good light detectors.

In other embodiments, the motion detector 20 may track the oscillatory motion of the mechanical cantilever 12 through electrical or magnetic measurements rather than through optical measurements as in the embodiment of FIG. 1. To enable such motion measurements, an electrical circuit or a magnetic particle may be fixed to the mechanical cantilever 12 near its free end 24. Then, electrical or magnetic measurements would provide the data signals needed to determine the mechanical resonance amplitude, mechanical resonance frequency and/or the phase lag behind the driver during the oscillatory motion of the mechanical cantilever 12.

The light detector 10 may optionally include a convex refractive lens or another type of focusing lens system 38. The lens or lens system 38 focuses the external light 29 onto a portion of the free end 24 of the mechanical cantilever 12 via the transparent window 18. Such focusing may enable increasing the light flux onto the mechanical cantilever 12 and thus, increase the overall sensitivity of the light detector 10 to the external light 29.

The light detector 10 of FIG. 1 measures one or more mechanical properties of the mechanical cantilever 12 that are affected by its kinematical response to the reflection and/or absorption of incident photons there from.

Figure 3:
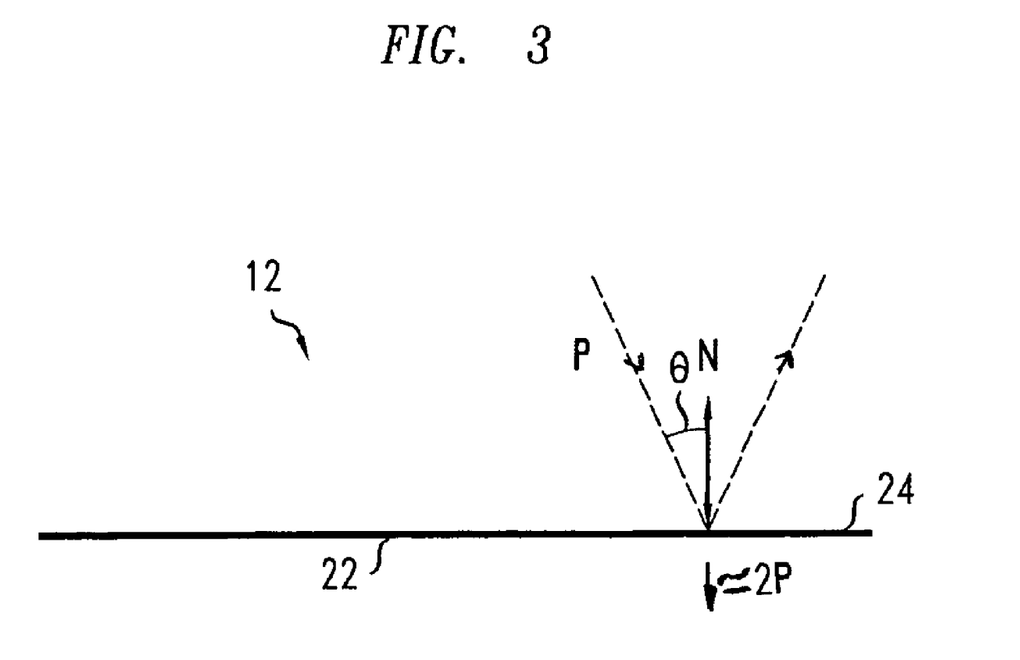
FIG. 3 is a side view of a distal portion of the mechanical cantilever of FIG. 1 illustrating kinematics associated with reflecting a photon off its top surface.

FIG. 3 illustrates the kinematics associated with reflection of a photon of momentum P off a portion of the top surface of the mechanical cantilever 12. The photon is incident on the top surface at an angle θ with respect to the normal vector, N, to the top surface. The reflected photon makes the same angle θ with the normal vector, N. Due to the reflection of the photon, the mechanical cantilever 12 receives an impulsive momentum transfer along a direction opposite to the normal vector, N. At high incidence angles where θ≈0, the transferred momentum is about equal to two times the incident photon's momentum, i.e., about 2P. Thus, as θ→0, the total transferred momentum approaches 2h/λ where "h" is Planck's constant and λ is the wavelength of the light.

Momentum transfers due to reflections and absorptions of photons may cause the mechanical cantilever 12 to mechanically flex along its length and/or about its physically attached end and/or may damp of the motion of the mechanical cantilever 12. If the driving frequency of the electro-mechanical driver 14 is much higher than the rate for substantial variation of the incident light intensity, the light effectively induces a substantially constant change in dynamic mechanical properties the oscillating mechanical cantilever 12. For that reason, the intensity of incident light can be measured through changes in the dynamical mechanical characteristics of the mechanical cantilever 12. Indeed, the flux of such incident light may change, e.g., the mechanical resonance frequency of the mechanical cantilever 12, the amplitude of resonant motion by the mechanical cantilever 12 and/or the phase lag of the mechanical cantilever 12 behind the electro-mechanical driver 14. The various embodiments may use any of these mechanical resonance properties as an indication of the intensity of the light incident on the top surface of the mechanical cantilever 12.

Figure 4:
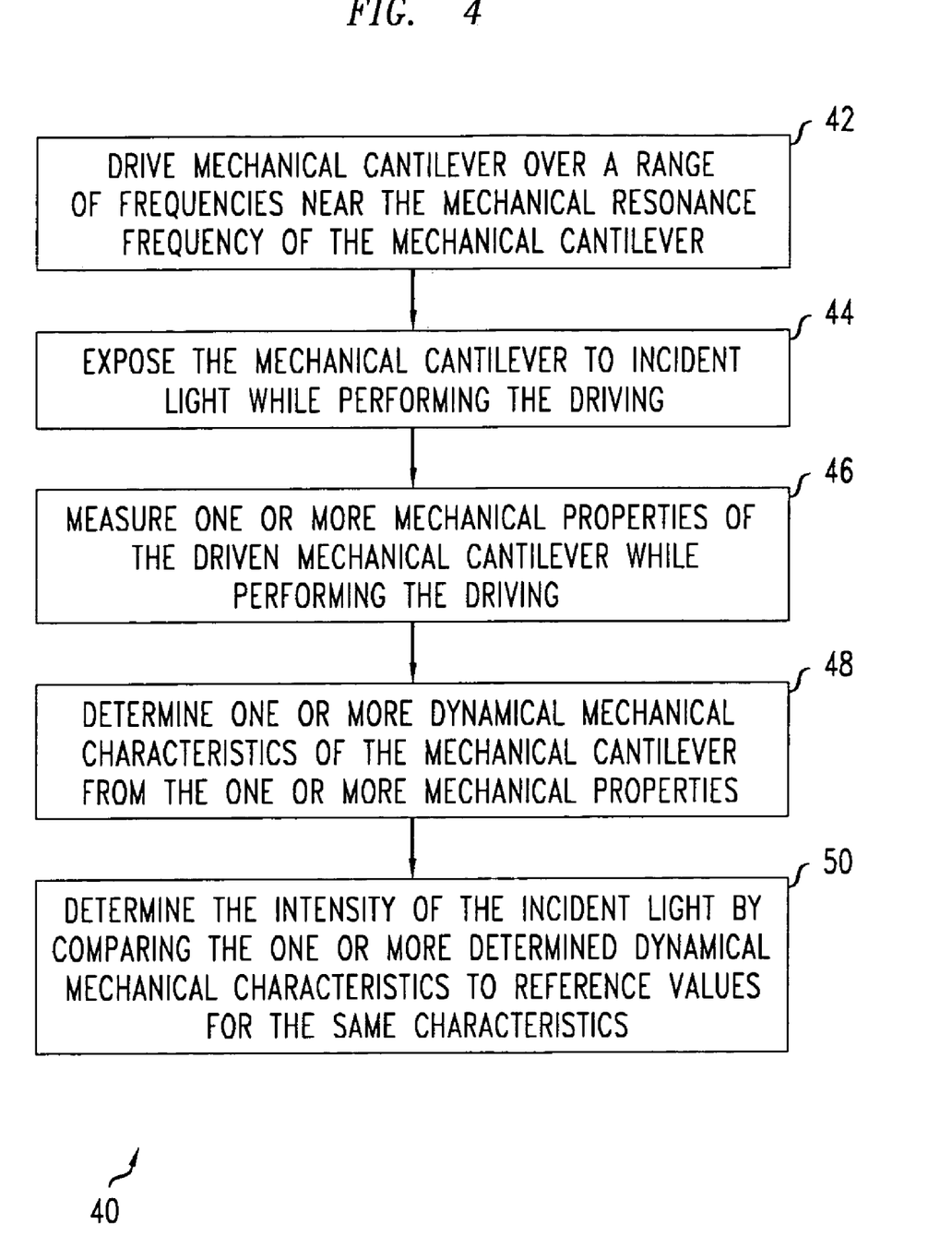
FIG. 4 is a flow chart illustrating one embodiment of a method for operating a light detector, e.g., the light detector of FIG. 1.

FIG. 4 illustrates a method 40 of operating a light detector that uses the dynamical mechanical reaction of a mechanical cantilever to measure the intensity of light incident thereon, e.g., the mechanical resonant response of the mechanical cantilever 12 of FIG. 1.

The method 40 includes driving the mechanical cantilever over a range of frequencies near the mechanical resonance frequency of the mechanical cantilever (step 42). The step of driving may include using the electro-mechanical driver 14 to drive the mechanical cantilever 14 at frequencies that sweep around the mechanical resonance frequency of the mechanical cantilever 12.

The method 40 includes exposing one surface of the mechanical cantilever to incident light while performing the driving of step 42 (step 44). The incident light causes, e.g., a flexing of the mechanical cantilever, wherein the flexing has a nonzero time average. In particular, the light would often flex the mechanical cantilever in a manner that varies more slowly in time than the period for the mechanical resonant motion of the mechanical cantilever.

The method 40 includes measuring one or more mechanical properties of the driven mechanical cantilever while performing the driving of step 42 (step 46). The measured mechanical property may be the oscillation amplitude of the mechanical cantilever as a function of the mechanical driving frequency and/or the phase lag of the motion of the mechanical cantilever behind the mechanical driver as a function of the mechanical driving frequency. For the mechanical cantilever 12, the motion detector 20 and a computer (not shown in FIG. 1) may measure the mechanical properties. The computer would receive data signals for motion/displacement measurements by the motion detector 20 and would determine the mechanical properties of the mechanical cantilever based on the data signals for said motion/displacement measurements.

The method 40 includes determining one or more dynamical mechanical characteristics of the mechanical cantilever from the value or values of the one or more dynamic mechanical properties measured at step 46 (step 48). The one or more determined dynamical mechanical characteristics may include the mechanical resonance frequency of the mechanical cantilever and/or the peak amplitude of the oscillatory motions of the mechanical cantilever at its mechanical resonance. The dynamical mechanical characteristics of the mechanical cantilever depend on the intensity of incident light, e.g., due to the change in the angular moment of inertia induced by such light.

The method 40 includes determining the light intensity incident on the mechanical cantilever during the driving step 42 by comparing the value or values of the one or more determined dynamical mechanical characteristics to reference values for the same characteristics (step 50). Determining the light intensity may involve, e.g., comparing the one or more dynamical mechanical characteristics as determined by performing steps 46 and 48 to stored values of the same one or more dynamical mechanical characteristics for reference light intensities.

In some embodiments, the method 40 may include a calibration phase. In the calibration phase, the mechanical-cantilever is subjected, e.g., to a sequence of reference light intensities, and steps 42, 44, 46, and 48 are performed to determine the value(s) selected one or more dynamical mechanical characteristics for each of the reference light intensities. Then, a list of reference light intensities and corresponding values of the one or more of the dynamical mechanical characteristics is made. The determination of an unknown light intensity at step 50 would include a comparing values of the one or more dynamical mechanical characteristics as determined for the unknown light intensity by performing steps 42, 44, 46, and 48 to the values of the same characteristics in the list. The unknown light intensity would be the reference light intensity that corresponds to the same values for the one or more dynamical mechanical characteristics.

Conventional methods are available for making very small mechanical cantilevers of crystalline silicon and dielectrics known in the microelectronics area. For example, some such methods are described, e.g., in the article "Attonewton force detection using ultrathin silicon cantilevers" by T. D. Stowe et al, which is published at Applied Physics Letters, No. 71 (1997) pages 288-90. The content of this article is incorporated herein by reference in its entirety.

Figure 5:
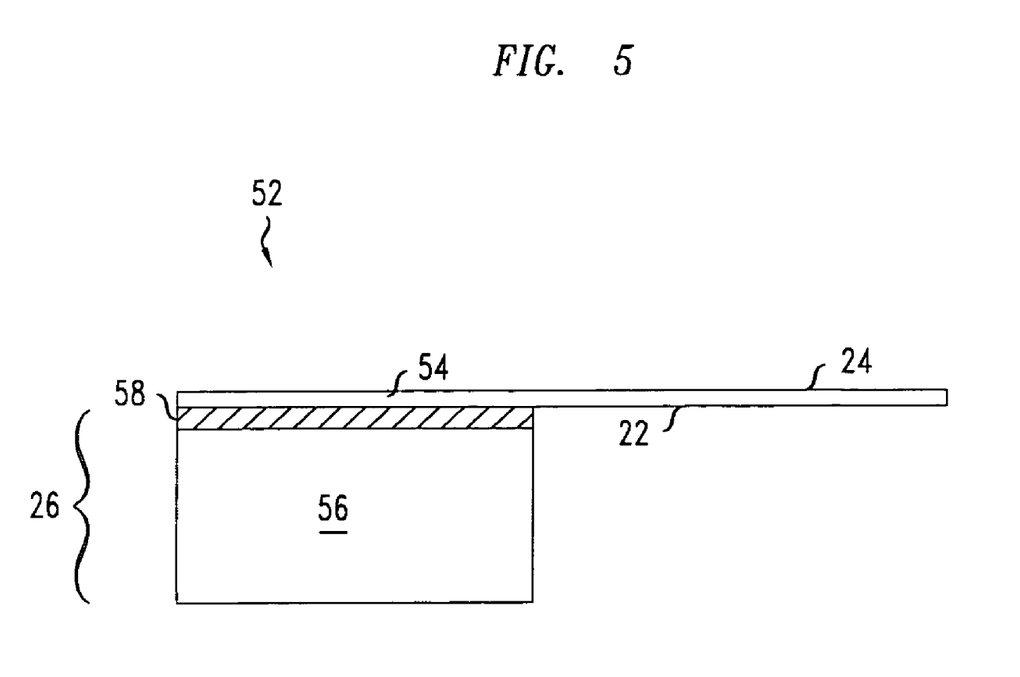
FIG. 5 is a side view illustrating an exemplary embodiment of a micro-mechanical cantilever that may be used in the light detector of FIG. 1.

Referring to FIG. 5, the methods of the above-discussed article and/or similar fabrication methods can produce a structure 52 for a micro-mechanical cantilever useable in the light detector 10 of FIG. 1. The structure 52 may include a mechanical cantilever whose arm has a thickness of less than 1 micrometer ($\mu m$), an arm-width of about 1 to 50 $\mu m$, and a length of about 10 to 200 $\mu m$. Such crystalline silicon micro-mechanical cantilevers can have a high flexibility that produces a high mechanical sensitivity to low fluxes of light.

The above-discussed fabrication methods and/or similar fabrication methods may include performing a sequence of steps. The sequence may include etching the micro-mechanical cantilever into a silicon layer 54 on a front side of a silicon-on-insulator (SOI) silicon wafer, e.g., via a mask-controlled etch. The etch may be a conventional plasma etch with a $SF_6$-based chemistry. The sequence may include depositing a protective layer on the front side to protect the etched micro-mechanical cantilever, e.g., a low temperature oxide layer and a low stress silicon nitride layer over the oxide layer. The sequence may include performing a conventional deep backside etch of the silicon portion of the SOI wafer 56. The etch is selected to stop on the insulator layer 58 of the SOI silicon wafer. The deep backside etch is mask-controlled to remove semiconductor that underlies the previously etched micro-mechanical cantilever. The sequence may include performing a front-side plasma etch, e.g., with a $SF_6$-based chemistry, to remove the protective nitride layer. The sequence may include performing a conventional buffered wet etch to remove the oxide layer around the micro-mechanical cantilever. After the wet etch, the sequence includes washing and drying the structure without subjecting the micro-mechanical cantilever to dangerous surface tension forces. In particular, the wet etchant can be first replaced with water, which is then, replaced by methanol. The methanol may be removed by drying in critical carbon dioxide where surface tension forces are very low or absent.

An imaging apparatus may include a plurality of the light detectors 10 of FIG. 1 and/or may be operated according to the method 40 of FIG. 4. Such imagining apparatus produce images based on spatially measured light intensities and may function, e.g., as an infrared camera.

Figure 6:
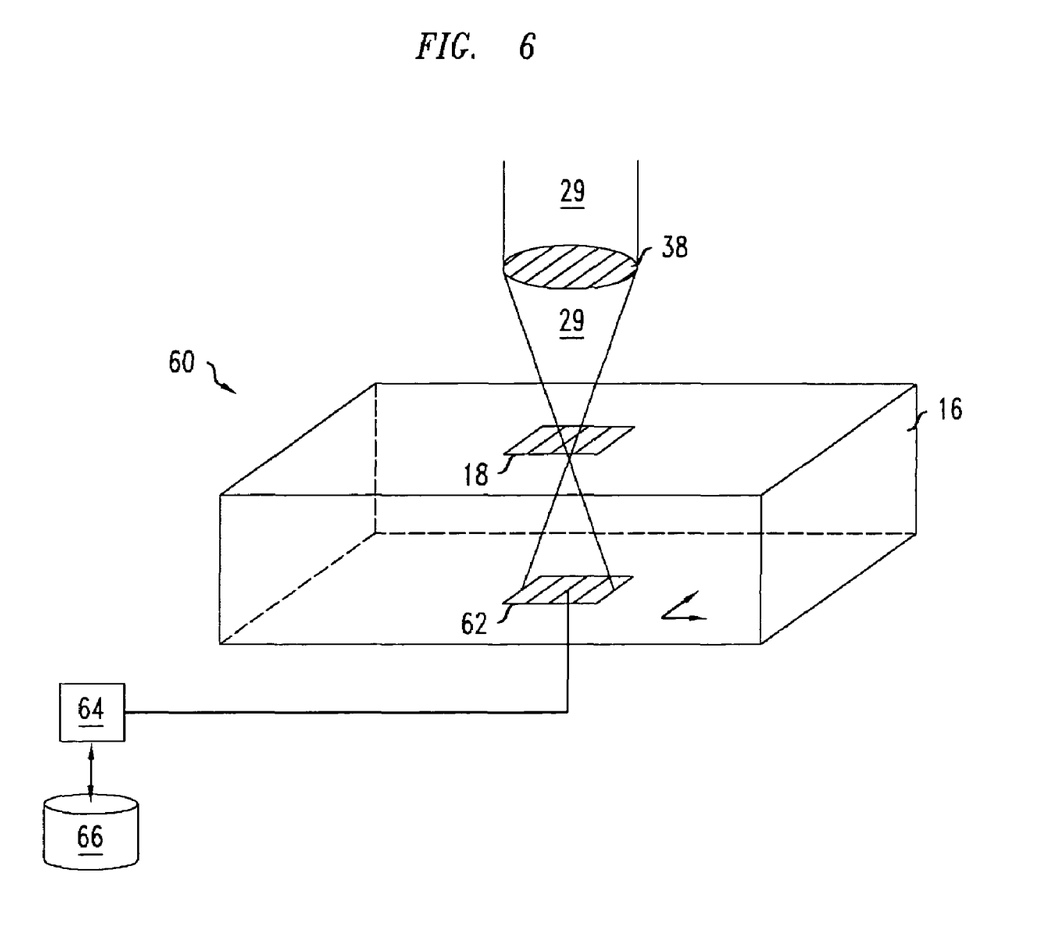
FIG. 6 is an oblique top view illustrating an apparatus for making 2-dimensional (2D) images.
Figure 7:
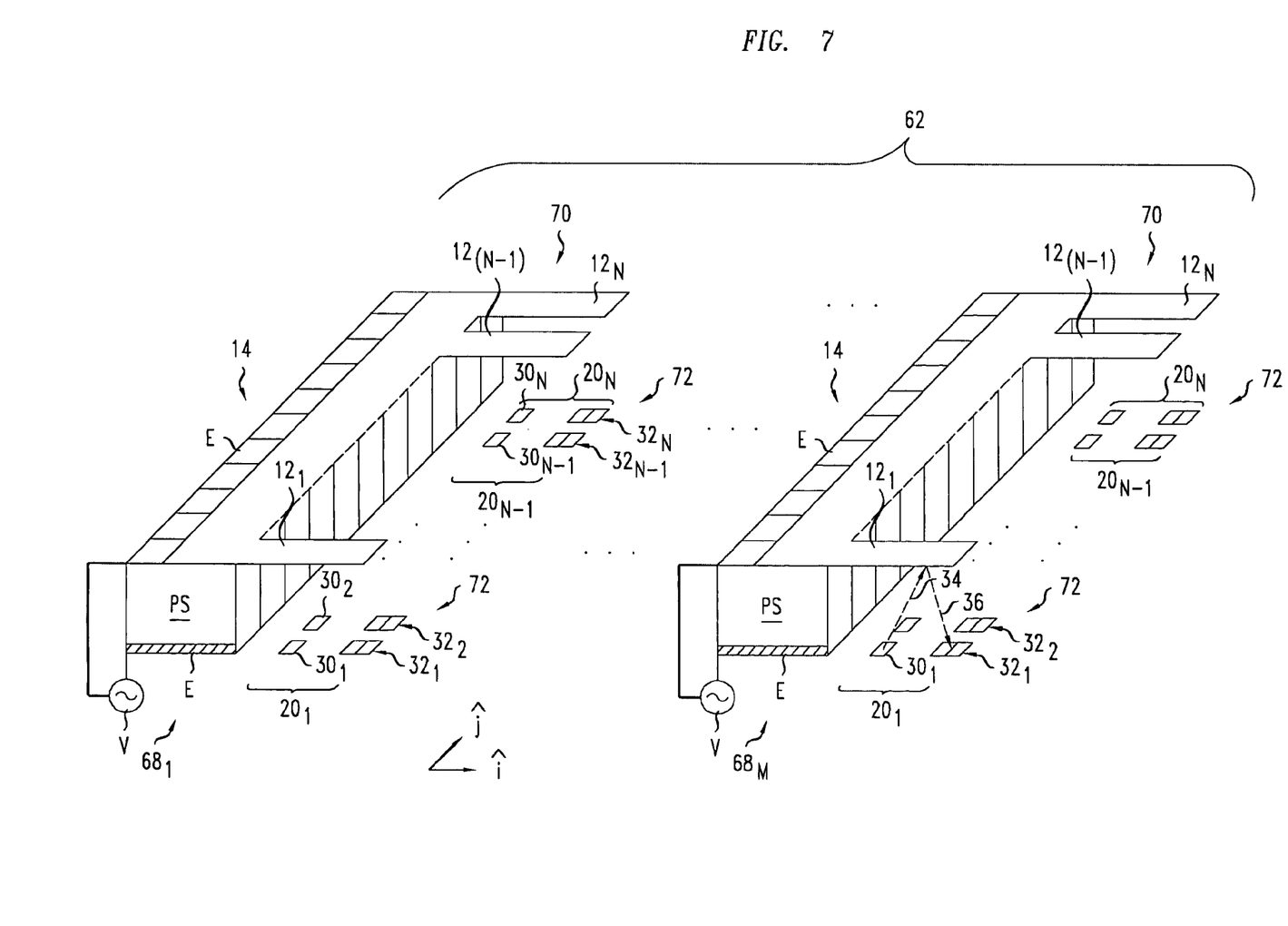
FIG. 7 is an oblique top view illustrating the light-sensitive pixelated area in the apparatus of FIG. 6

FIGS. 6 and 7 show an imaging apparatus 60 that is configured to make 2-dimensional (2D) images. The apparatus 60 has a 2D array of mechanical cantilevers that define a regular array of light-sensitive pixels along orthogonal $\hat{i}$ and $\hat{j}$ directions. These light-sensitive pixels enable the apparatus 60 to function as a camera that produces 2D images.

Referring to FIG. 6, the apparatus 60 includes a chamber 16, a window 18, a pixelated light-sensitive area 62, a digital processor 64, a data storage medium 66, and optionally includes an imaging lens system 38. The chamber 16 is hermetically sealed or pumped to maintain a substantial vacuum around the pixelated light-sensitive area 62, e.g., at a pressure of less than 0.01 atmospheres or even a pressure of about or less than 0.0001 atmospheres. The window 18 allows external light 29 to enter into the chamber 16. In some embodiments, the window 18 or another optical filter (not shown) may be positioned to optically bandpass filter the external light 29 that enters the chamber 16. Such filtering would configure the apparatus 60 to selectively form images with wavelengths of light within the bandpass of the optical filter. The pixelated light-sensitive area 62 includes a 2D array of individual devices that respond mechanically to incident light as light-sensitive pixels. Each such device generates data signals indicative of the intensity of light incident thereon. Due to the substantial vacuum, individual ones of the devices have dynamic mechanical responses that do not suffer from significant interference due to ambient gas. The optional imagining lens system 38 directs, at least, part of the external light 29 onto the pixelated light-sensitive area 62, e.g., to form a focused image thereon. The digital processor 64 is connected to receive the data signals generated by the individual devices of the pixelated light-sensitive device 62. From said received data signals, the digital processor 64 is configured to produce standard digital data for producing a 2D digital images that represent corresponding images formed by the external light 29 on the pixelated light-sensitive area 62. The data storage medium 66 is configured to receive and store the standard digital data for said images as produced by the digital processor 64. The data storage medium 66 may include a hard drive, an active memory, a magnetic storage medium, or an optical storage medium. The stored standard digital image data can be retrieved from the data storage medium 66 by the digital processor 64 or by a conventional data processing system (not show) to display a digital form of the original light image measured by the pixelated light-sensitive area 62.

Referring to FIG. 7, the pixelated light-sensitive area 62 has a 2D array of light-sensitive pixel regions that are regularly distributed along the orthogonal $\hat{i}$ and $\hat{j}$ directions. The pixelated light-sensitive area 62 includes a regular array of M substantially identical and parallel row elements $68_1, \ldots, 68_M$. The regular array of M row elements $68_1$-$68_M$ extends along the $\hat{j}$ direction. Each row element $68_1$-$68_M$ includes a linear spatial array of N light-sensitive pixel regions.

In the array, each row element $68_1$-$68_M$ includes a linear spatial array 70 of N mechanical cantilevers $12_1, \ldots, 12_{(N-1)}, 12_N$, e.g., micro-mechanical cantilevers; an electro-mechanical driver 14, and a linear spatial array 72 of motion detectors $20_1, \ldots, 20_{N-1}, 20_N$. Each mechanical cantilever $12_1$-$12_N$ is the light-sensitive element of an individual pixel region of the pixelated light-sensitive area 62. Each electro-mechanical driver 14 is physically configured to mechanically drive the entire array of mechanical cantilevers $12_1$-$12_N$ of the same row element $68_1$-$68_M$. That is, one end of each of the N mechanical cantilevers $12_1$-$12_N$ is physically attached to the single mechanical driver 14. The electro-mechanical driver 14 includes, e.g., a piezoelectric structure, PS, and an alternating voltage source, V, that connects across a pair of electrodes, E. Each pair of the electrodes, E, is located on opposite sides of one of the piezoelectric structures, PS. In each array 72, an individual motion detector $20_j$ includes a light source $30_j$, e.g., an LED, and a corresponding spatially segmented light detector $32_j$. Each light source $30_j$ directs a light beam to the back surface of the corresponding one of the mechanical cantilevers $12_j$ of the same row element $68_1$-$68_M$. Each light detector $32_j$ detects and measures a portion of the light beam of the corresponding light source $30_j$ that is reflected back by the corresponding mechanical cantilever $12_j$. These light measurements enable each motion detector $20_j$ to track the oscillatory motion of the corresponding mechanical cantilever $12_j$ as described e.g., with respect to the motion detector 20 of FIG. 1.

In some embodiments, the light sources $30_1$-$30_N$ and spatially segmented light detectors $32_1$-$32_N$ use a wavelength of light that is outside of the wavelength range imaged by the apparatus 60. For example, the light detectors $32_1$-$32_N$ of each row element $68_1$-$68_M$ may be linear arrays of the pixel elements of a segmented charge coupled detector (CCD) or a row adjacent pairs of photodiodes connected in differential configurations, or a row of four-quarter type photodetectors. CCDs are often sensitive to visible light and much less sensitive to infrared light. Nevertheless, even if the light detectors $32_1$-$32_N$ are CCDs, the apparatus 60 may be configurable to image infrared light, because the mechanical cantilevers $12_1$-$12_N$ may be configurable to be sensitive to infrared light. Thus, the use of the dynamic mechanical reaction of the mechanical cantilevers $12_1$-$12_N$ enables the production of a 2D imaging apparatus for light that is outside the sensitivity range of common CCDs to form images.

Figure 8:
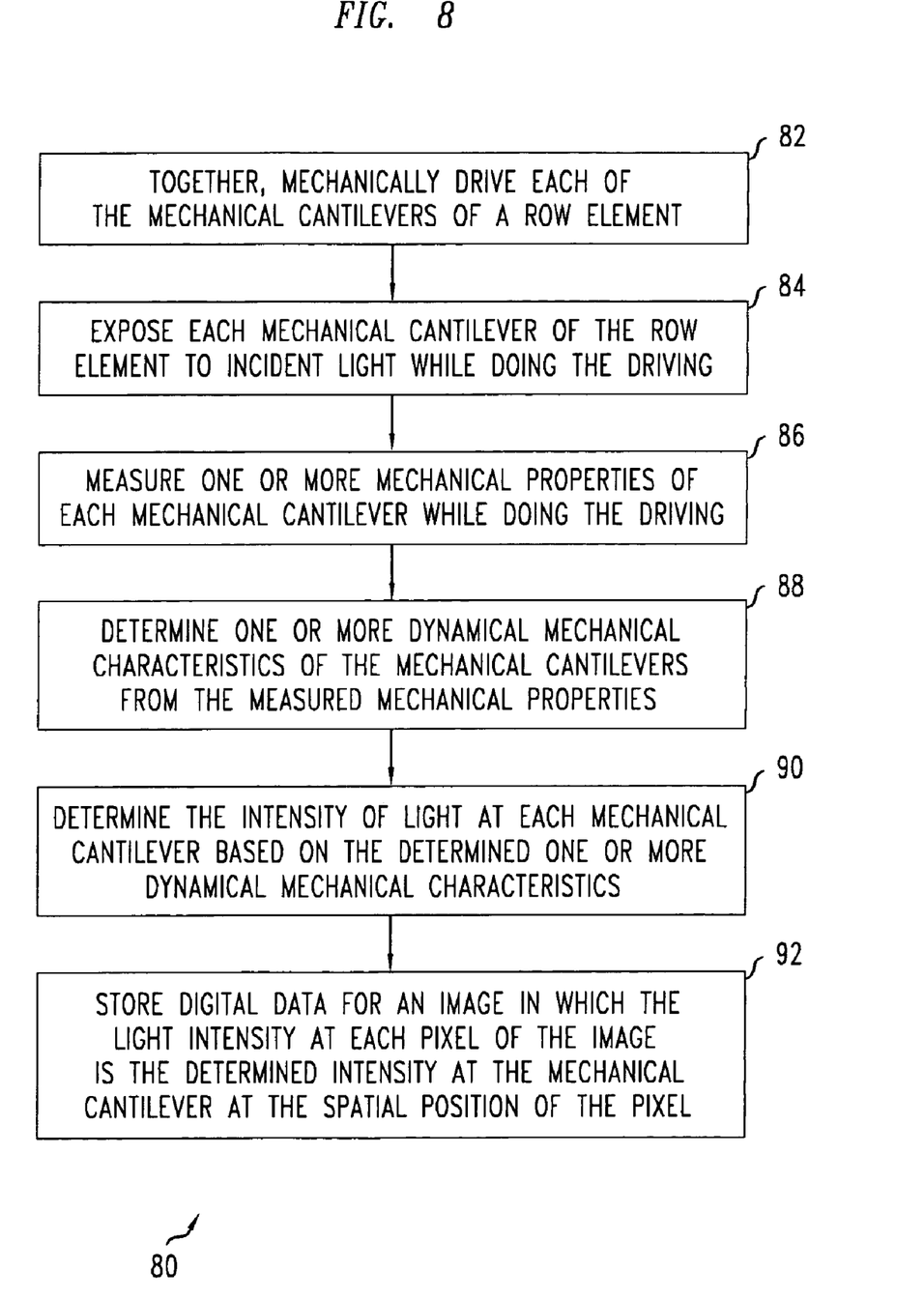
FIG. 8 illustrates a method of operating the apparatus of FIGS. 6-7 to produce a 2D image.

FIG. 8 illustrates a method 80 of operating the apparatus 60 of FIGS. 6-7 to produce a 2D image that corresponds to the image formed by light that is incident on the pixelated light-sensitive area 62. The method 80 includes mechanically driving each of the mechanical cantilevers $12_1$-$12_N$ of a single row element $68_j$ over a range of mechanical driving frequencies, e.g., as in step 42 of method 40 (step 82). Here, the single electro-mechanical driver 14 drives each of the mechanical cantilevers $12_1$-$12_N$ of the same row element $68_j$ together. The method 80 includes exposing each of the mechanical cantilevers $12_1$-$12_N$ of the same row element $68_j$ to incident light while performing the step of driving, e.g., as in step 44 of the method 40 (step 84). The method 80 includes measuring one or more mechanical properties of each of the mechanical cantilevers $12_1$-$12_N$ of the same row element $68_j$ while performing the step of driving, e.g., as in step 46 of the method 40 (step 86). The step 86 of measuring includes measuring the positions or motions of the mechanical cantilevers $12_1$-$12_N$ with the motion detectors $20_1$-$20_N$ of the same row element $68_j$. The method 80 includes determining one or more dynamical mechanical characteristics, e.g., a mechanical resonance amplitude or a mechanical resonance frequency, of the mechanical cantilevers $12_1$-$12_N$ of the same row element $68_j$ from the one or more measured mechanical properties for the same mechanical cantilever $12_1$-$12_N$, e.g., as in step 48 of the method 40 (step 88). The method 80 includes determining the intensity of light at each of the mechanical cantilevers $12_1$-$12_N$ of the same row element $68_j$ by comparing the determined one or more dynamical mechanical characteristics to reference values of the same characteristics for the same mechanical cantilevers $12_1$-$12_N$, e.g., as at step 50 of method 40 (step 90). The steps 86 and 88 of determining may be performed, e.g., in the processor 64. The method 80 includes storing digital data for an image in the data storage medium 66 (step 92). The stored digital data for the image is such that the light intensity at each pixel of said image is the determined intensity of light at the mechanical cantilever $12_1$-$12_N$ that is located at the same or corresponding spatial position as the pixel of the image.

From the disclosure, drawings, and claims, other embodiments of the invention will be apparent to those skilled in the art.

What is claimed is:

1. An apparatus, comprising:
a chamber having an interior;
an electro-mechanical driver;
a mechanical cantilever being located in the interior, the mechanical cantilever having a first end attached to the electro-mechanical driver and having second end that is free, the driver being configured to drive the mechanical cantilever to perform an oscillatory motion; and
a window located along a wall of the chamber to enable external light to enter the chamber and illuminate a portion of the mechanical cantilever, the mechanical cantilever being configured to mechanically respond to being illuminated by light entering the chamber via the window.

2. The apparatus of claim 1, further comprising:
a motion detector configured to track the position of the mechanical cantilever.

3. The apparatus of claim 2, wherein the motion detector includes a light source configured to direct light toward a surface of the cantilever and a detector configured to output a data signal indicative of a position of the mechanical cantilever in response to measuring a reflected part of light beam.

4. The apparatus of claim 3, further comprising a processor being configured to determine an intensity of the external light from the data signal output by the light detector.

5. The apparatus of claim 2, wherein the chamber is substantially evacuated of gas.

6. The apparatus of claim 2, wherein the window is configured to block visible light.

7. The apparatus of claim 1, further comprising an optical lens positioned to concentrate part of the light onto the portion of the mechanical cantilever.

8. The apparatus of claim 5, wherein the chamber has a lower pressure than about 0.001 atmospheres.

9. A method, comprising:
exposing one surface of a mechanical cantilever to incident light while driving the mechanical cantilever over a range of frequencies;
determining one or more dynamical mechanical characteristics of the mechanical cantilever from measurements on a motion of the mechanical cantilever while performing the driving; and
determining the intensity of the incident light from the determined one or more dynamical mechanical characteristics.

10. The method of claim 9, wherein the exposing further comprises maintaining a substantial vacuum around the mechanical cantilever.

11. The method of claim 9, wherein one of the one or more determined dynamical mechanical characteristics is representative of a mechanical resonance characteristic of the mechanical cantilever.

12. The method of claim 10, wherein one of the one or more determined dynamical mechanical characteristics is indicative of a mechanical resonance frequency, a mechanical resonance amplitude or a phase lag of the driven mechanical cantilever.

13. The method of claim 9, wherein the determining the intensity further comprises comparing the determined one or more dynamical mechanical characteristics to reference values of the same one or more characteristics.

14. An apparatus, comprising:
an electro-mechanical driver;
an array of mechanical cantilevers, each cantilever having a first end physically attached to the electro-mechanical driver and having a second end free to perform an oscillatory motion in response to the first end being driven by the electro-mechanical driver; and
an array of motion detectors, each motion detector is configured to track a position of a corresponding one of the mechanical cantilevers; and
wherein each mechanical cantilever is mechanically responsive to an intensity of light incident thereon.

15. The apparatus of claim 14, further comprising:
a substantially evacuated chamber, the array of mechanical cantilevers being located in the chamber; and
a window located to enable light to enter the chamber and illuminate the mechanical cantilevers.

16. The apparatus of claim 15, wherein the window is configured to block visible light.

17. The apparatus of claim 15, further comprising a processor being connected to receive data signals from the motion detectors and to produce image data indicative of an intensity pattern formed by the light incident on the mechanical cantilevers based on the received data signals.

18. The apparatus of claim 17, wherein the processor is configured to determine an intensity of light incident on one of the mechanical cantilevers based on a value of a mechanical resonance characteristic of the one of the mechanical cantilevers determined from the received data signals.

19. The apparatus of claim 14, further comprising an optical lens positioned to form an image on the array of cantilevers.

20. The apparatus of claim 14, wherein the chamber has a lower pressure than about 0.001 atmospheres.

* * * * *